3,001,408
GYRO STABILIZATION
Sabine L. Baring-Gould, Boston, Mass., assignor, by mesne assignments, to Northrop Corporation, Beverly Hills, Calif., a corporation of California
Filed Nov. 23, 1959, Ser. No. 854,873
10 Claims. (Cl. 74—5.4)

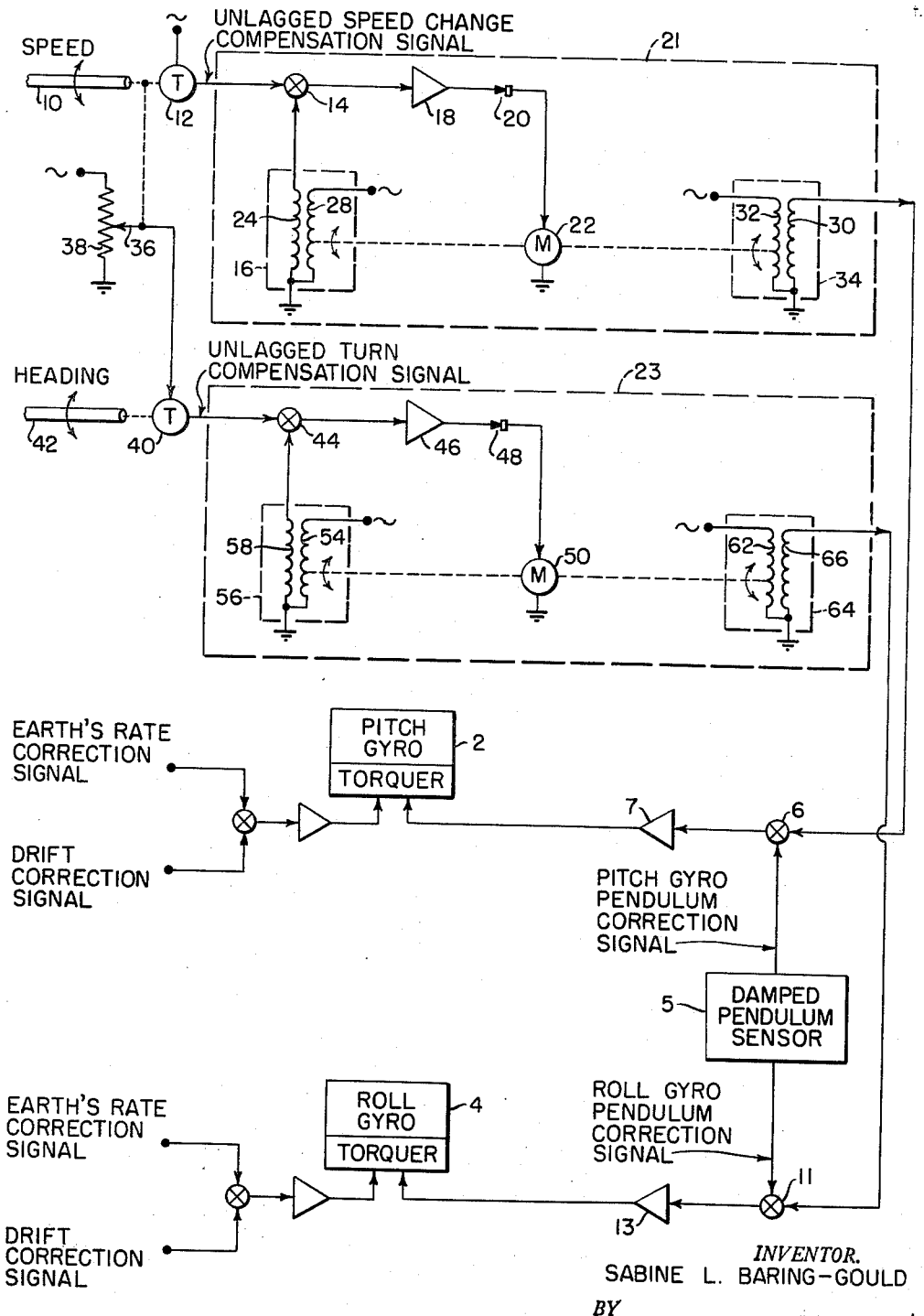

This invention relates in general to a new and improved gyro stabilization system and in particular to a gyro stabilization system of the type which employs a damped sensing element or a sensing element whose output is modified so as to provide a damped output signal.

In a stabilization system where a stable platform is defined by a pair of mutually perpendicular, single-degree-of-freedom gyros, a vertical sensor is usually employed in order to provide a pair of signals proportional to the deviation of the gyros from the vertical about a corresponding pair of mutually perpendicular axes, e.g. the roll and pitch axes respectively. Each of these signals is applied to a torquer motor associated with the respective gyros. The torquer applies torque about the gyro output axis in order to bring about corrective precessing of the gyro spin axis about the gyro input axis. In shipborne gyro applications, it is frequently necessary to mount the gyros and the associated vertical sensor some distance above the center of motion of the ship. As a result, the sensor is subjected to high spurious accelerations, particularly about the ship's roll axis. This is especially the case where a pendulum-type sensor is employed and it results in the precession of the stable platform about its stabilized horizontal position.

By using a highly damped sensor, e.g. a damped pendulum or a sensor such as an accelerometer whose output is modified to provide a damped output signal, it has been possible in the past to minimize such disturbances. However, where such damping has been used, it has seriously interfered with the process of compensating for the effect of sensor-derived correction signals in cases where no corrective gyro torquing is desired. For example, with a damped pendulum sensor undesired pendulum correction signals are derived as a result of acceleration due to maneuvers of the ship such as turning or a change of speed. In order to obtain proper compensation in these cases, appropriate compensation signals must be introduced to the gyro torquers in synchronism with the pendulum correction signals. The application to the gyro torquers of compensation signals which are derived substantially simultaneously with the ship's maneuvers, causes the gyros to precess before the damped pendulum has fully responded to the disturbance. As a result, instead of compensating for the effect of the undesired pendulum correction signals, the compensation signal produces an undesirable gyro precession away from the vertical. Similarly at the conclusion of the maneuver, the damped pendulum, having been subjected to turning and/or linear accelerations, continues to hang off after the compensating signals have disappeared and an undesirable gyro precession is produced by the pendulum correction signals.

It is, accordingly, the primary object of this invention to provide a gyro stabilization system of the type described in which the undesirable effects of sensor damping or sensor output damping are overcome and the gyros are properly corrected by applying the vertical deviation correction signals to the gyro torquers in synchronism with their corresponding acceleration compensation signals.

In accordance with the invention which forms the subject matter of this application, a gyro stabilization system is provided which employs a damped sensor to provide vertical deviation correction signals proportional to gyro deviation from the vertical. The correction signals are modified by the application of suitably derived compensation signals in order to correct for the effect of undesired correction signals derived as a result of ship maneuvers. The compensation signals are appropriately lagged so as to be applied to the gyros in synchronism with the vertical deviation correction signals. In a preferred embodiment of the invention, lag is provided by means of a pair of closed servo loops whose gain is chosen in accordance with the pendulum damping constant. The servo loops are energized with the respective unlagged compensation signals and provide appropriately lagged signals at their respective outputs which are then applied to the gyro torquers in synchronism with the pendulum deviation correction signals. As a result, the stable platform is maintained substantially horizontal even during violent motions or maneuvers of the ship.

These and other objects of the invention together with further features and advantages thereof will become apparent from the following detailed specification when read in connection with the accompanying drawing, the single figure of which illustrates a preferred embodiment of the invention.

With reference now to the drawing, the invention is illustrated as applied to the gyro stabilization system of a ship which employs a pair of single-degree-of-freedom gyros in order to define a stable platform. The pitch gyro 2 is mounted so as to be sensitive to motion about the ship's pitch axis, while the roll gyro 4 is sensitive to motion about the ship's roll axis. Each gyro includes a torquer which, upon being energized, is capable of precessing the gyro spin axis by torquing the gyro gimbal about the gyro output axis. A vertical sensor 5, in this case a pendulum which is highly damped in order to overcome the effect of spurious accelerations and cooperating transducers, provides a pair of correction signals for application to the respective gyro torquers, upon deviation from the vertical about the pitch or roll axes respectively. The pitch gyro pendulum correction signal is applied as one input of a summing circuit 6. In the illustrated embodiment of the invention, the output of the summing circuit 6 is connected to an amplifier 7 which has a predetermined linear amplification range centered about the zero point. The output of the amplifier 7 is applied to the pitch gyro torquer. For the sake of completeness, although it does not form a part of the invention herein, the pitch gyro is shown as receiving an additional correction signal consisting of the amplified summation of a signal proportional to the rate of rotation of the earth and a signal proportional to gyro drift.

In similar manner, the roll gyro pendulum correction signal is applied as a first input of a summing circuit 11, the output of which is applied to an amplifier 13. The amplifier 13 has a predetermined linear amplification range that is centered about the zero point and is connected to the torquer of the roll gyro 4. As in the case of the pitch gyro, an amplified correction signal is additionally applied to the roll gyro torquer which consists of the summation of the earth's rate correction signal and the drift correction signal.

The position of a shaft 10 about its own axis is proportional to the speed of the ship which carries the gyro stabilization system. The shaft 10 is mechanically geared to the rotor of a tachometer 12 which is excited from a constant amplitude A.C. source to provide an output signal proportional to the linear change of the ship's speed, i.e. a linear acceleration. This tachometer output is provided substantially simultaneously with the corresponding ship maneuver and is accordingly labeled the unlagged speed change compensation signal. As such, it is applied to the input of a servo loop 21, where it forms one input of a nulling circuit 14. The output signal of the nulling circuit 14 is applied to an amplifier 18 whose output in turn, is connected to a rectifier 20. The rectified output signal is applied to a D.C. motor 22 which is preferably of the shunt wound or permanent magnet type. An induction potentiometer 16 has an output winding 24 which is electrically connected as a second input of the nulling circuit 14. An input winding 28 is excited from a constant amplitude A.C. source. The input winding which is rotatable with respect to winding 24, is geared to the output shaft of the D.C. motor 22. The output shaft of the D.C. motor 22 is further geared to the input winding 32 of an induction potentiometer 34. The input winding is rotatable with respect to an output winding 30 of the potentiometer 34 and is excited from a constant A.C. source. The output of the potentiometer 34 constitutes the output of the servo loop 21 and is connected to the second input of the above-mentioned summing circuit 6.

The shaft 10 is further geared to the variable tap 36 of a potentiometer 38 which is excited from a constant amplitude A.C. source. An electrical output signal is thus provided which is proportional to the ship's speed and which is applied as the excitation signal of a tachometer 40. A shaft 42 whose position is proportional to ship's heading is mechanically geared to the rotor of the tachometer 40. The output signal of the tachometer 40, which is thus proportional to the acceleration that occurs during a turning maneuver of the ship, is provided substantially simultaneously with the corresponding ship maneuver and is labeled the unlagged turn compensation signal. As such, it forms the input of a servo loop 23 and is applied as a first input of a nulling circuit 44. The output signal of the nulling circuit 44 is applied to an amplifier 46 whose output, in turn, is connected to a D.C. motor 50 which may again be shunt wound or of the permanent magnet type. An induction potentiometer 56 has an input winding 54 which is geared to the output shaft of the motor 50 and which is rotatable with respect to an output winding 58. The input winding 54 is excited from a constant amplitude A.C. source. The output winding 58 is electrically connected as the second input of the nulling circuit 44. The output shaft of the D.C. motor is further geared to the input winding 62 of an induction potentiometer 64 which is rotatable with respect to an output winding 66 of the potentiometer. The input winding 62 is excited from a constant A.C. source. The potentiometer output constitutes the output of the servo loop 23 and is applied as the second input of the above-mentioned summing circuit 11.

The purpose of the gyro stabilization system is to define a stable platform which will serve as a true horizontal reference. To this end, the two single-degree-of-freedom gyros are mounted so as to be responsive to motion about the ship's pitch and roll axes respectively and reference to the true vertical is had by means of the damped pendulum. Error of the platform, e.g. about the roll axis, will produce a pendulum correction signal at the output of the damped pendulum sensor 5, which is applied to the roll gyro torquer in order to precess its gyro spin axis. In similar manner, platform error about the pitch axis produces a pendulum correction signal which is applied to the pitch gyro torquer in order to precess the pitch gyro spin axis. Additional corrective signals are applied to the respective gyro torquers in accordance with the rate of rotation of the earth and the spin axis drift of each gyro from its null position.

As pointed out above, compensation is required to overcome the effect of the undesired pendulum correction signals which are derived as a result of pendulum deviation from the true vertical during ship maneuvers. Such compensation is obtained by modifying the pendulum correction signals which are applied to the respective gyro torquers, with appropriate speed change and turn compensation signals. Proper compensation will be obtained only if the compensation signals are applied in synchronism with their corresponding pendulum correction signals. Thus, the compensation signals which are provided at the outputs of the tachometers 12 and 40 respectively, substantially simultaneously with the ship maneuvers, cannot be used directly to modify the correction signals derived from the pendulum sensor 5, due to the phase difference of the respective signals.

If the condition of the servo loop 21 is initially such that zero signal appears at the output of the nulling circuit 14, the D.C. motor 22 is at rest. If the ship now changes its linear speed, the damped pendulum sensor 5 applies an erroneous correction signal to the nulling circuit 6. The change of ship's speed further causes the tachometer 12 to provide a proportional output signal which, upon being amplified and rectified, is applied to the motor 22. In response, the motor output shaft rotates the input winding 28 until the feedback signal is equal in amplitude to the unlagged speed change compensation signal and the nulling circuit 14 produces zero output signal. The position of the output shaft of the D.C. motor 22 thus depends ultimately on the amplitude of the output signal derived from the tachometer 12 which, in turn, depends on the magnitude of the ship's linear change of speed. The speed of response of the motor 22 is proportional at all times to the amplitude of its input signal and further depends on the gain of the servo loop. The servo gain may be adjusted in a number of ways, e.g. by varying the gain of the amplifier 18, or by varying the gear ratio between the output shaft of the motor 22 and the input winding 28. The output shaft of the motor 22 is further geared to the input winding 32 of the induction potentiometer 34 to derive a servo output signal which is proportional to motor shaft position and which is completely isolated from the feedback signal. The servo gain is chosen in accordance with the pendulum damping constant so that the servo output signal lags the servo input signal. The phase lag is variable and depends on the amplitude of the servo input signal and hence, on the magnitude of the linear speed change. It will be understood that the effect of pendulum damping on the pendulum correction signal similarly varies with the magnitude of the linear speed change. By properly adjusting the gain of the servo loop 21 in accordance with the pendulum damping constant, the output signal of the servo 21, i.e. the lagged speed change compensation signal, is provided in synchronism with its corresponding pitch gyro pendulum correction signal to permit proper summation in the nulling circuit 6. In similar manner, the gain of the servo loop 23 is chosen to provide a lagged turn compensation signal in synchronism with the roll gyro pendulum correction signal to permit proper summation in the nulling circuit 11. Accordingly, with the invention herein it is possible to provide properly compensated pendulum correction signals for gyro deviation from the true vertical without limiting the location of the pendulum sensor to avoid spurious accelerations.

The invention is not limited to the illustrated embodiment and can be modified in a number of different ways. For example, A.C. motors could be employed in place of the D.C. servo motors shown in the drawing, which could be energized directly from the output of the servo amplifiers. Similarly, D.C. tachometers could be employed. In the latter case, the tachometer 12 and the potentiometer 38 would be D.C.-excited. The speed change and turn compensation signals can be obtained in any desired manner, the illustrated apparatus being exemplary only. Nor is the invention limited to the use of the induction potentiometers illustrated herein. For example, it would be possible to use an ordinary potentiometer or an auto-transformer having a variable tap, or the like, in place of the induction potentiometers 16, 34, 56 and 64. Similarly, an induction potentiometer could be substituted for the potentiometer 38. It will be understood that the use of amplifiers, as shown in the drawing, is dependent only on the required signal strength to drive the respective motors and that in certain instances the amplifiers could be eliminated entirely. A common excitation source could be employed for all the potentiometers and tachometers, provided only that proper isolation is maintained between the different components. It is also possible to derive the feedback and output signals of each servo loop from a single transducer if proper isolation is provided between these signals.

It will be understood that the invention is not limited to the use of servo loops for providing proper lagging of the respective compensation signals. For example, it would be possible to obtain appropriately lagged compensation signals by substituting a lag circuit, properly designed to compensate for the pendulum damping factor, between the input and output respectively of each servo loop. The appropriate lag correction function could also be carried out prior to the servo input and the servo loop itself could be eliminated. In appropriate situations only a single compensation signal is required. In these cases, for example where a turn compensation signal only is provided, a single servo is sufficient to provide proper lagging.

The invention herein is not restricted to a gyro stabilization system which uses a pair of single-degree-of-freedom gyros, but is also applicable where a two-degree-of-freedom gyro is employed. Similarly, the invention is useful not only in systems where a damped pendulum is employed, but in any system using either a damped sensor or a sensor whose output signal is modified to provide a damped output.

From the foregoing disclosure of the invention, it will be apparent that numerous modifications, departures and equivalents will not occur to those skilled in the art, all of which fall within the true spirit and scope of the invention.

I claim:

1. In combination with a gyro stabilized platform mounted on a dirigible craft, a damped pendulum having a predetermined damping constant, means controlled by said pendulum for adjusting the position of said platform with respect to a vertical reference, means responsive to the acceleration of said craft along a horizontal axis fixed with respect to the craft for generating a first signal in accordance with said acceleration, time delay means controlled by said acceleration responsive means for generating a second signal in accordance with said first signal and delayed by an amount selected in accordance with the damping constant of said pendulum, and means controlled by said second signal for adjusting said platform to compensate for deviations from said vertical reference caused by said acceleration.

2. An acceleration compensation system for a gyro stabilized platform mounted on a dirigible object, comprising, in combination, damped acceleration measuring means for generating a delayed first signal in accordance with deviations of the resultant of accelerations acting on said object from a vertical reference, second acceleration measuring means for generating a second signal in accordance with the resultant of accelerations on said object caused by changes in speed and orientation in horizontal plane, time delay means controlled by said second signal for generating a third signal in accordance with said second signal and delayed an amount equal to the delay of said first signal, and means controlled by the algebraic sum of said first and third signals for adjusting the platfrom to a predetermined position with respect to said vertical reference.

3. A vertical referencing system for a gyro stabilized platform on a dirigible craft, comprising, in combination, a pendulum mounted to respond to deviations of said craft from a vertical reference and damped to be unresponsive to short period rolling and pitching motions of said craft, means for producing a first signal in accordance with the position of said pendulum with respect to said vertical reference and delayed by an amount determined by the damping constant of said pendulum, speed measuring means for producing a second signal in accordance with the speed of the craft, differentiating means controlled by said second signal for producing a third signal in accordance with the acceleration of the craft, a first servomechanism controlled by said third signal for producing a pitch correcting signal in accordance with said acceleration signal, said servomechanism having a gain determined by the damping constant of said pendulum to delay said pitch correction signal in accordance with the delay of said first signal, means for generating a fifth signal in accordance with the heading of said craft, means controlled by said second signal and said fifth signal for generating a turn acceleration signal, a second servomechanism controlled by said turn acceleration signal to produce a roll correction signal in accordance with said turn acceleration signal, said second servomechanism having a gain determined by the damping constant of said pendulum to delay said roll correction signal in accordance with the delay of said first signal, means controlled by said first signal and said pitch correction signal for adjusting the pitch attitude of said platform in accordance with the algebraic sum thereof, and means controlled by said first signal and said roll correction signal for adjusting the roll attitude of said platform in accordance with the algebraic sum thereof, said correction signals being of a sense to oppose heading and speed change components in said first signal, whereby said platform is stabilized with respect to said vertical reference.

4. A vertical referencing system for a gyro stabilized platform on a dirigible craft, comprising, in combination; a damped pendulum having a predetermined damping constant mounted to respond to deviations of said platform from a vertical reference; means controlled by said pendulum for producing a first signal, delayed by an amount determined by said damping constant, in accordance with deviations of the platform from said vertical reference; acceleration measuring means for generating a second signal in accordance with the acceleration of said craft; means adjusted in accordance with said damping constant for delaying said second signal by an amount equal to the delay of said first signal; and means controlled by said first signal and said delayed second signal for adjusting said platform to a predetermined attitude with respect to said reference.

5. In combination with a gyro stabilized platform on a dirigible craft, first condition responsive means having a delayed response for generating a first signal in accordance with the sum of the deviation from a reference attitude and a spurious component caused by acceleration of said craft, second condition responsive means for generating a second signal in accordance with the acceleration of said craft, time delay means for delaying said second signal to match the response of said first condition responsive means, summing means controlled by said first signal and said delayed second signal for producing an output in accordance with the deviation of said platform from said reference attitude, and means controlled by the output of said summing means for adjusting said platform to said reference attitude.

6. In combination with a gyro stabilized platform mounted for universal movement on a movable object, said object being subject to a substantially constant reference acceleration, a first varying acceleration of relatively high frequency, and a second varying acceleration of relatively low frequency; an acceleration responsive device; means for damping said device to respond selectively, after a delay, to said reference acceleration and said second varying acceleration; means controlled by said device for adjusting said platform to a reference attitude; means responsive to said second acceleration for producing an output in accordance therewith; time delay means controlled by said output for producing a signal in accordance with said second acceleration and delayed to match the delay of said acceleration responsive device; and means controlled by said signal for modifying the adjustment of said platform to remove deviations from said reference attitude caused by the response of said acceleration responsive device to said second varying acceleration.

7. Apparatus for adjusting a ship mounted gyro stabilized platform to a predetermined attitude with respect to a vertical reference, comprising, in combination, a pendulum mounted to respond to deviations of said platform from said predetermined attitude, said pendulum being damped sufficiently to be non-responsive to ship roll, means responsive to accelerations of said platform caused by changes in ship speed and heading for producing signals in accordance therewith, means adjusted in accordance with the damping constant of said pendulum for delaying said signals to match the response of said pendulum, and means controlled by said pendulum and said delayed signals for adjusting said platform to said predetermined attitude.

8. In combination with a gyro stabilized platform mounted on a ship, a damped pendulum having a predetermined damping constant, means controlled by said pendulum for generating a first signal in accordance with departure of said platform from a reference pitch attitude, means for generating a second signal in accordance with the speed of said ship, means controlled by said second signal for generating a third signal in accordance with the rate of change of said speed, a signal generator, a servomechanism having a gain selected in accordance with said damping constant operatively connected to said signal generator and controlled by said third signal to actuate said signal generator to produce a fourth signal in phase opposition to a spurious component of said first signal caused by speed changes of said ship, and means controlled by the sum of said first and fourth signals for adjusting the pitch attitude of said platform.

9. In combination with a gyro stabilized platform mounted on a ship, a damped pendulum having a predetermined damping constant, means controlled by said pendulum for generating a first signal in accordance with departure of said platform from a reference roll attitude, means for generating a second signal in accordance with the speed of the ship, a tachometer generator energized by said second signal and having an input shaft, means for adjusting said input shaft in accordance with the heading of the ship, whereby said generator produces a third signal in accordance with the turning acceleration of said ship, a signal generator, a servomechanism having a gain selected in accordance with said damping constant operatively connected to said signal generator and controlled by said third signal to actuate said signal generator to produce a fourth signal in phase opposition to a spurious component of said first signal caused by turning of said ship, and means controlled by the sum of said first and fourth signals for adjusting the roll attitude of said platform.

10. In combination with a gyro stabilized platform mounted on a ship and means controlled by a damped pendulum for adjusting said platform to a vertical reference attitude, said pendulum having a damping constant sufficient to make it insensitive to short period pitch and roll of the ship but insufficient to make it insensitive to long period pitch and roll accelerations caused by changes in speed and heading of said ship, means for correcting for said long period accelerations, comprising; means controlled by the speed and heading of the ship for producing output signals in accordance with the pitch and roll accelerations caused by turning and speed change maneuvers of the ship, servo means having a gain selected in accordance with said damping constant and controlled by said signals to produce output signals delayed to match the response characteristics of said pendulum, and means controlled by said output signals for adjusting said platform to remove deviations from said vertical reference due to maneuvers of said ship.

References Cited in the file of this patent
UNITED STATES PATENTS

| | | |
|---|---|---|
| 2,752,792 | Draper et al. | July 3, 1956 |
| 2,762,123 | Schultz | Sept. 11, 1956 |
| 2,811,043 | Bonnell | Oct. 29, 1957 |
| 2,912,865 | Cremiers | Nov. 17, 1959 |